US012060831B1

(12) United States Patent
Williams et al.

(10) Patent No.: US 12,060,831 B1
(45) Date of Patent: Aug. 13, 2024

(54) BANKED FORCE MODIFICATION FOR FUEL NOZZLES

(71) Applicant: Collins Engine Nozzles, Inc., Des Moines, IA (US)

(72) Inventors: Brandon P. Williams, Johnston, IA (US); Michael Ferrarotti, Durham, CT (US); Murtuza Lokhandwalla, South Windsor, CT (US); Todd Haugsjaahabink, Amherst, MA (US); Russell P. Rourke, Jr., East Granby, CT (US); Jay W. Kokas, Bloomfield, CT (US); Richard E. Versailles, New Hartford, CT (US)

(73) Assignee: Collins Engine Nozzles, Inc., Des Moines, IA (US)

( * ) Notice: Subject to any disclaimer, the term of this patent is extended or adjusted under 35 U.S.C. 154(b) by 0 days.

(21) Appl. No.: 18/244,551

(22) Filed: Sep. 11, 2023

(51) Int. Cl.
*F02C 7/228* (2006.01)
*F02C 7/232* (2006.01)
*F02C 7/22* (2006.01)
*F02C 9/26* (2006.01)

(52) U.S. Cl.
CPC .............. *F02C 7/228* (2013.01); *F02C 7/232* (2013.01); *F02C 7/222* (2013.01); *F02C 9/263* (2013.01)

(58) Field of Classification Search
CPC .......... F02C 7/228; F02C 7/232; F02C 7/222; F02C 9/26; F02C 9/263
See application file for complete search history.

(56) References Cited

U.S. PATENT DOCUMENTS

| 2003/0172641 | A1* | 9/2003 | Dixon | F02C 7/228 60/734 |
| 2012/0042657 | A1* | 2/2012 | Hodinot | F02C 7/232 60/734 |
| 2014/0311599 | A1* | 10/2014 | Haugsjaahabink | F02C 9/30 137/565.11 |
| 2018/0372323 | A1* | 12/2018 | Griffiths | F02C 9/34 |

* cited by examiner

*Primary Examiner* — Steven M Sutherland
(74) *Attorney, Agent, or Firm* — Kinney & Lange, P.A.

(57) ABSTRACT

A system includes a plurality of injectors each having a respective main circuit configured to be connected in fluid communication with one manifold for supplying fuel to each injector in the plurality of injectors. Each injector in the plurality of injectors includes a respective hydromechanical scheduling valve member configured to regulate fuel flow from a respective inlet to a respective nozzle of each injector of the plurality of injectors as a function of pressure input from the manifold to the respective main circuits. A valve block is connected in fluid communication with a respective auxiliary circuit in each injector in the plurality of injectors. The auxiliary circuit is operatively connected to adjust position of the respective scheduling valve member for actuating force modification of the scheduling valve member. The valve block is configured to control all of the injectors in the plurality of injectors as a block.

19 Claims, 9 Drawing Sheets

BANKED FORCE MODIFICATION FOR FUEL NOZZLES

BACKGROUND

1. Field

The present disclosure relates to fuel injection, and more particularly to fuel injection in gas turbine engines such as those aboard aircraft.

2. Description of Related Art

Conventional fuel injectors that contain flow scheduling valves are passive, where the flow response is fully based on the input pressure. A resistive spring provides the force balance to limit the rate at which the schedule valve opens. These valves can be used to divide flow as well, providing multiple flow paths that can be sequenced/schedule based on inlet fuel pressure, valve open area, and any downstream flow devices such as atomizers. At relatively low flow conditions, the flow schedule valve is largely responsible for most of the metering and therefore consumes/requires the majority of the fuel pressure. At relatively high flow conditions, there is a transition of pressure drop from the valve to other components downstream of the valve. Gas turbine combustors will typically have a natural frequency that may become excited when a certain heat release is attained. Quite often, this is at ground conditions; however, it can also be a concern at multiple flow conditions. This condition can cause significant levels of noise and occasionally may negatively impact the health of the structural components within and around the combustor.

To mitigate this noise, adjustments to fuel scheduling may be directed, in an attempt to decouple the heat release and noise; however, these attempts require additional flow dividing hardware and fuel manifolds adding significant cost, weight, and power requirements.

The conventional techniques have been considered satisfactory for their intended purpose. However, there is an ever present need for improved systems and methods for adjusting flow in passive injection valves. This disclosure provides a solution for this need.

SUMMARY

A system includes a plurality of injectors each having a respective main circuit configured to be connected in fluid communication with one manifold for supplying fuel to each injector in the plurality of injectors. Each injector in the plurality of injectors includes a respective hydromechanical scheduling valve member configured to regulate fuel flow from a respective inlet to a respective nozzle of each injector of the plurality of injectors as a function of pressure input from the manifold to the respective main circuits. A valve block is connected in fluid communication with a respective auxiliary circuit in each injector in the plurality of injectors. The auxiliary circuit is operatively connected to adjust position of the respective scheduling valve member for actuating force modification of the scheduling valve member. The valve block is configured to control all of the injectors in the plurality of injectors as a block.

The plurality of injectors can be a first sub-set of injectors. A second sub-set of injectors can be passive, simplex nozzles configured to issue fuel independent of the valve block. The first sub-set of injectors can be grouped circumferentially offset from the second sub-set of injectors around a gas turbine engine combustor. A controller can be electrically connected to the valve block for control thereof or for ganged control of the respective auxiliary circuits. The valve block can be configured as a proportional valve with intermediate conditions between fully open and fully closed for control of the respective auxiliary circuits between full flow and no flow. The valve block can be configured as a discrete on/off binary state valve with conditions fully open and fully closed for control of the respective auxiliary circuits of full flow and no flow. At least one of the injectors in the plurality of fuel injectors can include a mass flow sensor operatively connected to the controller to provide mass flow feedback to the controller. Loss of electrical power to the valve block can cause the respective scheduling valve members to return to a position determined by mechanical components and regulates fuel flow as per a scheduling surface of each of the respective scheduling valve members.

The respective main circuit can be a secondary circuit, wherein each in injector in the plurality of injectors includes a primary circuit. The primary and secondary circuits can connect between the inlet of the injector and two respective outlets of the nozzle of the injector for staged flow output from the nozzle. For each injector of the plurality of injectors, the scheduling valve member can be biased to a closed position by one or more biasing members of the injector. The scheduling valve member can be configured to regulate flow from the inlet of the injector to the secondary circuit. The scheduling valve member can include a scheduling surface configured to vary flow area through the secondary circuit based on position of the valve spool within the injector.

For each injector in the plurality of injectors, the respective auxiliary circuit can bypass the scheduling valve member to indirectly actuate the scheduling valve member by changing pressure downstream of the scheduling valve member. The manifold can connect directly to the respective main circuit of each injector in the plurality of injectors. A portion of the respective main circuit can branch from the injector to feed an inlet of the valve block with pressure from the manifold. A respective outlet branch of the valve block can be connected in fluid communication with a respective auxiliary circuit inlet to supply the respective auxiliary circuit selectively based on state of the valve block.

The manifold can connect directly to the respective main circuit of each injector in the plurality of injectors. The manifold can be connected to feed an inlet of the valve block directly without passing through any of the injectors. A respective outlet branch of the valve block can be connected in fluid communication with a respective auxiliary circuit inlet to supply the respective auxiliary circuit selectively based on state of the valve block. A check valve in a line connecting the manifold to the inlet of the valve block can be configured to block backflow from the valve block to the manifold.

The manifold can connect directly to the respective main circuit of each injector in the plurality of injectors. It can be that in only one of the injectors in the plurality of injectors, a portion of the respective main circuit branches from the injector to feed an inlet of the valve block with pressure from the manifold. A respective outlet branch of the valve block can be connected in fluid communication with a respective auxiliary circuit inlet for each injector in the plurality of injectors to supply the respective auxiliary circuit selectively based on state of the valve block.

For each injector in the plurality of injectors, the respective auxiliary circuit can be in fluid communication with a back side of the scheduling valve member to hydraulically actuate the scheduling valve member by changing pressure on the back side of the scheduling valve member.

The manifold can connect directly to the respective main circuit of each injector in the plurality of injectors. A portion of the respective main circuit can branch from the injector to feed an inlet of the valve block with pressure from the manifold. A respective outlet branch of the valve block can be connected in fluid communication with a respective auxiliary circuit inlet to supply the respective auxiliary circuit selectively based on state of the valve block.

The manifold can connect directly to the respective main circuit of each injector in the plurality of injectors. The manifold can be connected to feed an inlet of the valve block directly without passing through any of the injectors. A respective outlet branch of the valve block can be connected in fluid communication with a respective auxiliary circuit inlet to supply the respective auxiliary circuit selectively based on state of the valve block. A check valve in a line connecting the manifold to the inlet of the valve block can be configured to block backflow from the valve block to the manifold. The valve block can be incorporated in only one of the injectors in the plurality of injectors.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
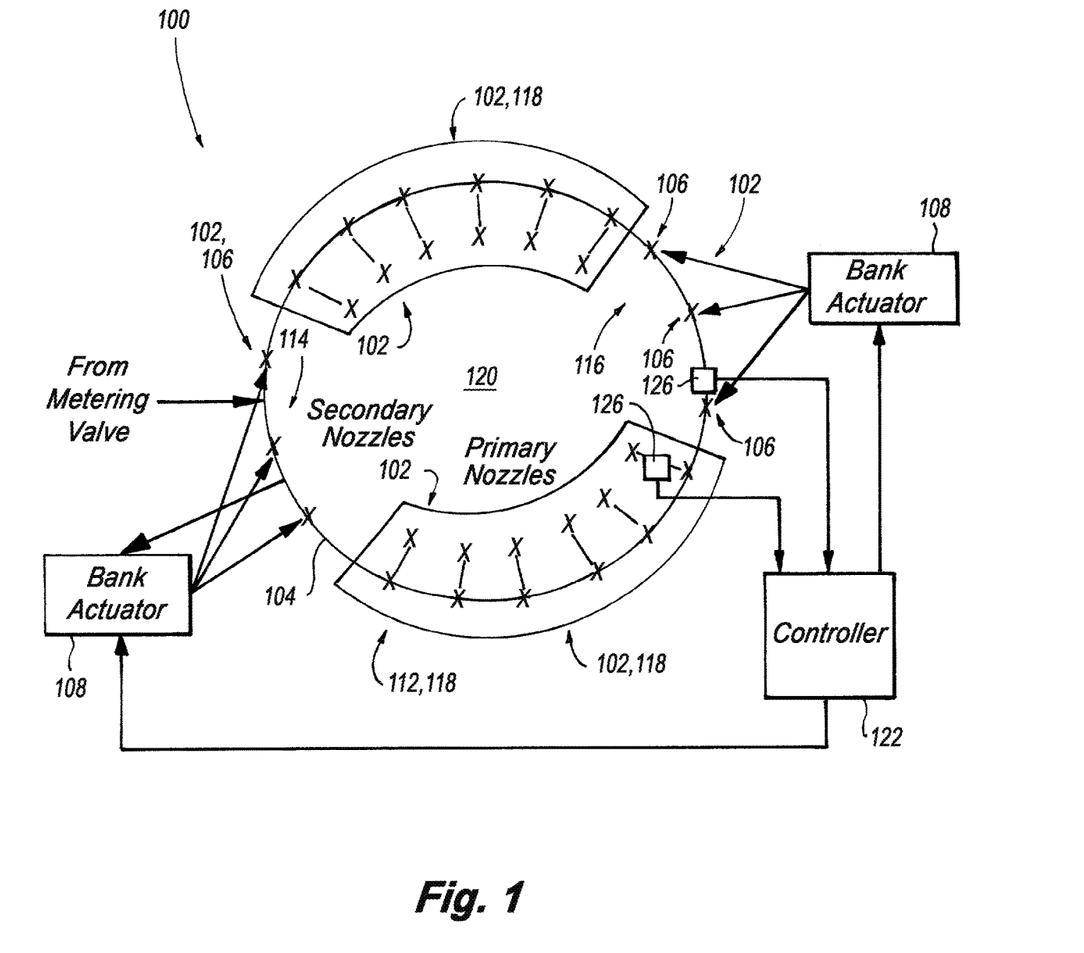
FIG. 1 is a schematic perspective view of an embodiment of a system constructed in accordance with the present disclosure, showing the circumferentially spaced sub-sets of actively and passively controlled injectors.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-9, as will be described. The systems and methods described herein can be used to provide block valving control for force modification actuation of multiple fuel injectors.

The system 100 includes a plurality of injectors 102 each having a respective main circuit configured to be connected in fluid communication with one manifold 104 for supplying fuel to each injector 102. A first group of injectors 102 are in a first sub-set of injectors, namely a group of force modification injectors 106. An actuator bank or valve block 108 is connected in fluid communication with a respective auxiliary circuit 110 (labeled in FIG. 2) in each injector 106. The auxiliary circuit 110 is operatively connected to adjust position of the respective scheduling valve member 112 for actuating force modification of the scheduling valve member 112. In FIG. 1, there are two blocks 114, 116 of force modification injectors 106, however any suitable number of blocks can be used. For each block 114, 116, the valve block 108 is configured to control all of the injectors 106 connected thereto a block, i.e. all of the injectors 106 connected to a given one of the valve blocks 108 receive the same actuation flow/pressure from their valve block 108.

A second sub-set of injectors 118 are passive, simplex or duplex nozzles configured to issue fuel independent of the valve blocks 108, i.e. injectors 118 issue fuel as provided to them from the metering valve labeled in FIG. 1 that pressurizes the manifold 104, without any force modification actuation. The two groups of injectors 118 are grouped circumferentially offset from, alternating circumferentially with, the two blocks 114, 116 of the force modification injectors 108 around a gas turbine engine combustor 120.

Figure 2:
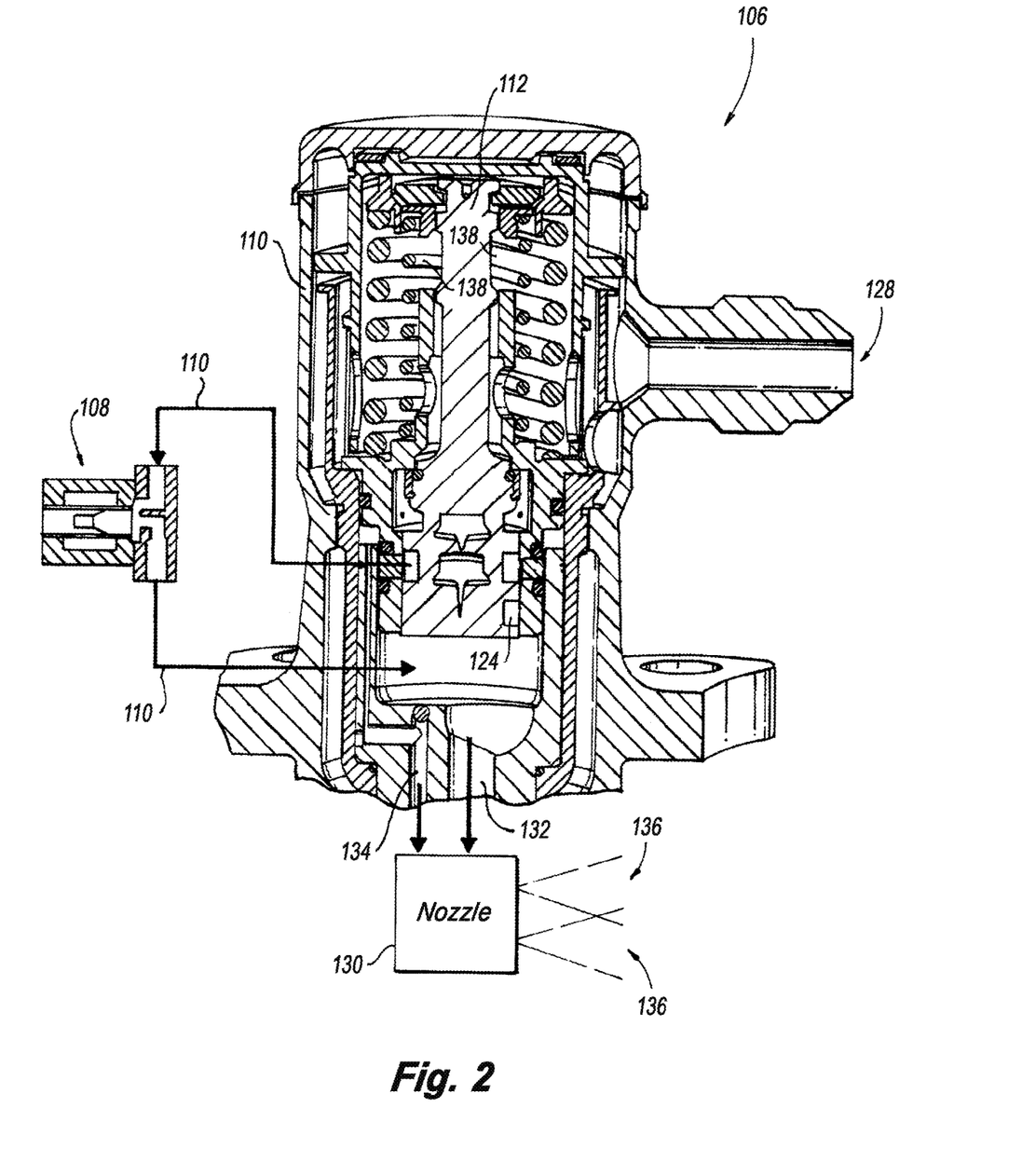
FIG. 2 is a schematic view of a portion of one of the injectors of FIG. 1, showing a configuration for direct control through the secondary circuit.

A controller 122 is electrically connected to each valve block 108 for control thereof or for ganged control of the respective auxiliary circuits 110 (labeled in FIG. 2). The valve blocks 108 can be proportional valves with intermediate conditions between fully open and fully closed for control of the respective auxiliary circuits 110 between full flow and no flow, for example, each valve block 108 can include a proportional solenoid or a stepper motor/servo, or the like. It is also contemplated that for on/off binary control of the auxiliary circuits 110, each valve block 108 can instead be configured as a discrete on/off binary state valve with conditions fully open and fully closed for control of the respective auxiliary circuits 100 of full flow and no flow. Loss of electrical power to a valve block 108 causes the respective scheduling valve members 112 (labeled in FIG. 1) of the force modification injectors 106 to return to a position determined by mechanical components and regulates fuel flow as per the scheduling surface 124 (labeled in FIG. 2) of each of the respective scheduling valve members 112.

At least one of the injectors 106, 118 a mass flow sensor 126 operatively connected to the controller 122 to provide mass flow feedback to the controller 122 for force modification control of the injectors 106. Any suitable type of flow sensor 126 can be used, such as hot wire anemometers, pitot tubes, ultrasonic, National Institute of Standards and Technology (NIST) type calibration orifice sensors, thermocouples, pressure transducers, turbine wheels, Coriolis meters, or chemiluminescence sensors for signals from flame.

With reference now to FIG. 2, flow scheduling for the force modification injectors 106 is described. Flow scheduling valves and functions for this purpose are described in U.S. Pat. No. 5,732,730, which is incorporated by reference herein in its entirety. Each injector 106 includes a respective hydromechanical scheduling valve member 112, e.g. a valve spool, configured to regulate fuel flow from a respective inlet 128 (connected to the manifold 104 in FIG. 1) to a respective nozzle 130 of each injector 106 as a function of pressure input from the manifold 104 to the respective main circuits 132.

The respective main circuit 132 is a secondary circuit, wherein each in injector in the plurality of injectors also includes a primary circuit 134. The primary and secondary circuits 134, 132 connect between the inlet of the injector 128 and two respective outlets 136 of the nozzle 130 for staged flow output from the nozzle 130, e.g. a pilot stage and a main stage. For each injector 106, the scheduling valve member 112 is biased to a closed position by one or more biasing members 138 of the injector 106. The scheduling valve member 112 is configured to regulate flow from the inlet 128 of the injector 106 to the secondary circuit 132, whereas the primary circuit 134 can be controlled by the flow metering valve, labeled in FIG. 1. The scheduling valve member includes a scheduling surface 124 configured to vary flow area through the secondary circuit 132 based on position of the valve spool 112 within the injector 106. For each injector 106, the respective auxiliary circuit 110 bypasses the scheduling valve member 112 to indirectly actuate the scheduling valve member 112 by changing pressure downstream of the scheduling valve member 112.

Figure 3:
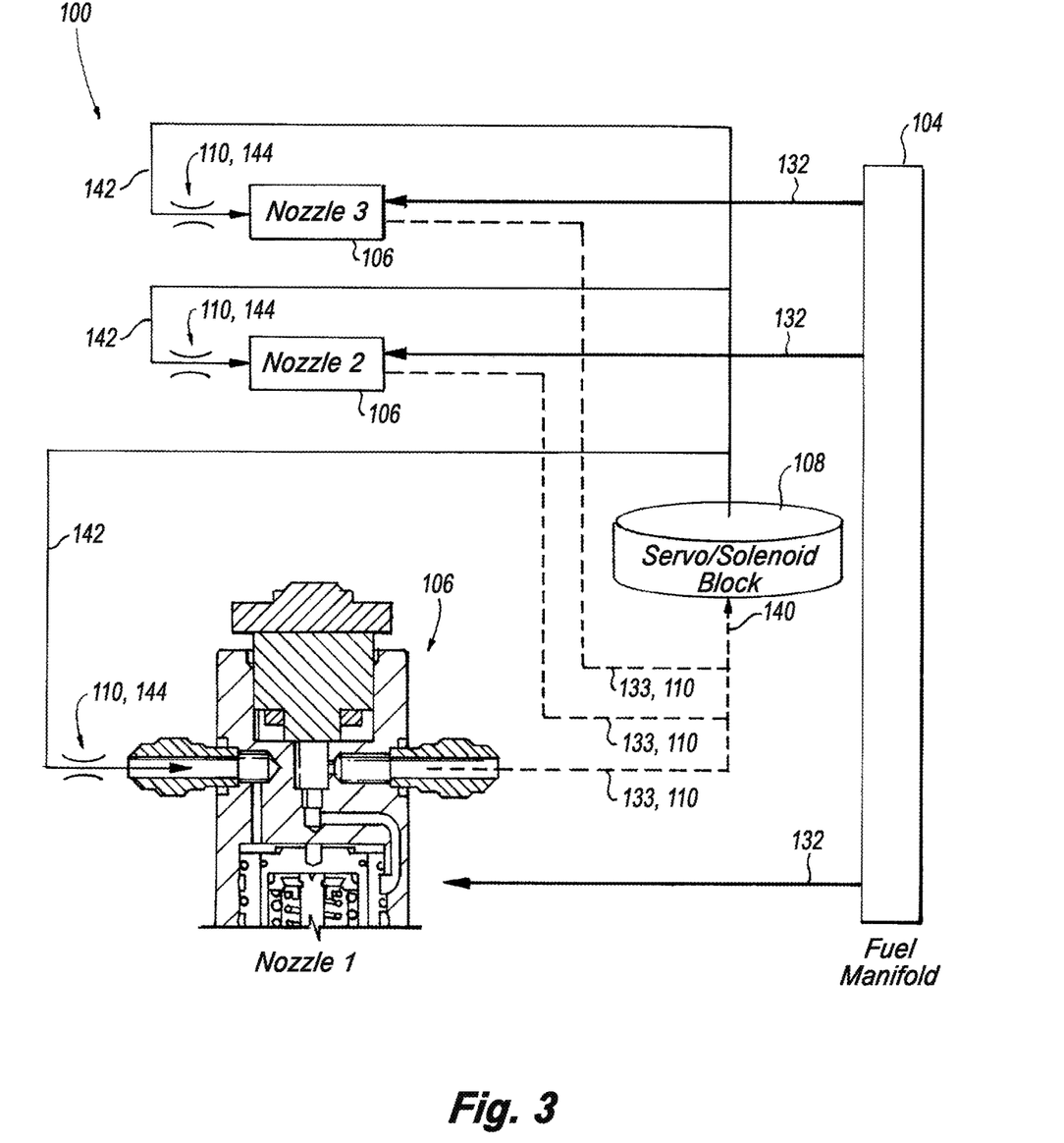
FIGS. 3-5 are schematic views of different configurations for connecting the valve block of the system of FIG. 1 to the actively controlled injectors, using the injector configuration of FIG. 2.

With reference now to FIG. 3, the manifold 104 (labeled in FIG. 1) connects directly to the respective main circuit 132 of each injector 106 in the plurality of injectors 106. A portion 133 of the respective main circuit 132 branches from the injector 106 as part of the auxiliary circuit 110 to feed an inlet 140 of the valve block 108 with pressure from the manifold 104. A respective outlet branch 142 of the valve block 108 is connected as part of the auxiliary circuit 110 in fluid communication with a respective auxiliary circuit inlet 144 of each injector 106 to supply the respective auxiliary circuit 110 selectively based on state of the valve block 108.

Figure 4:
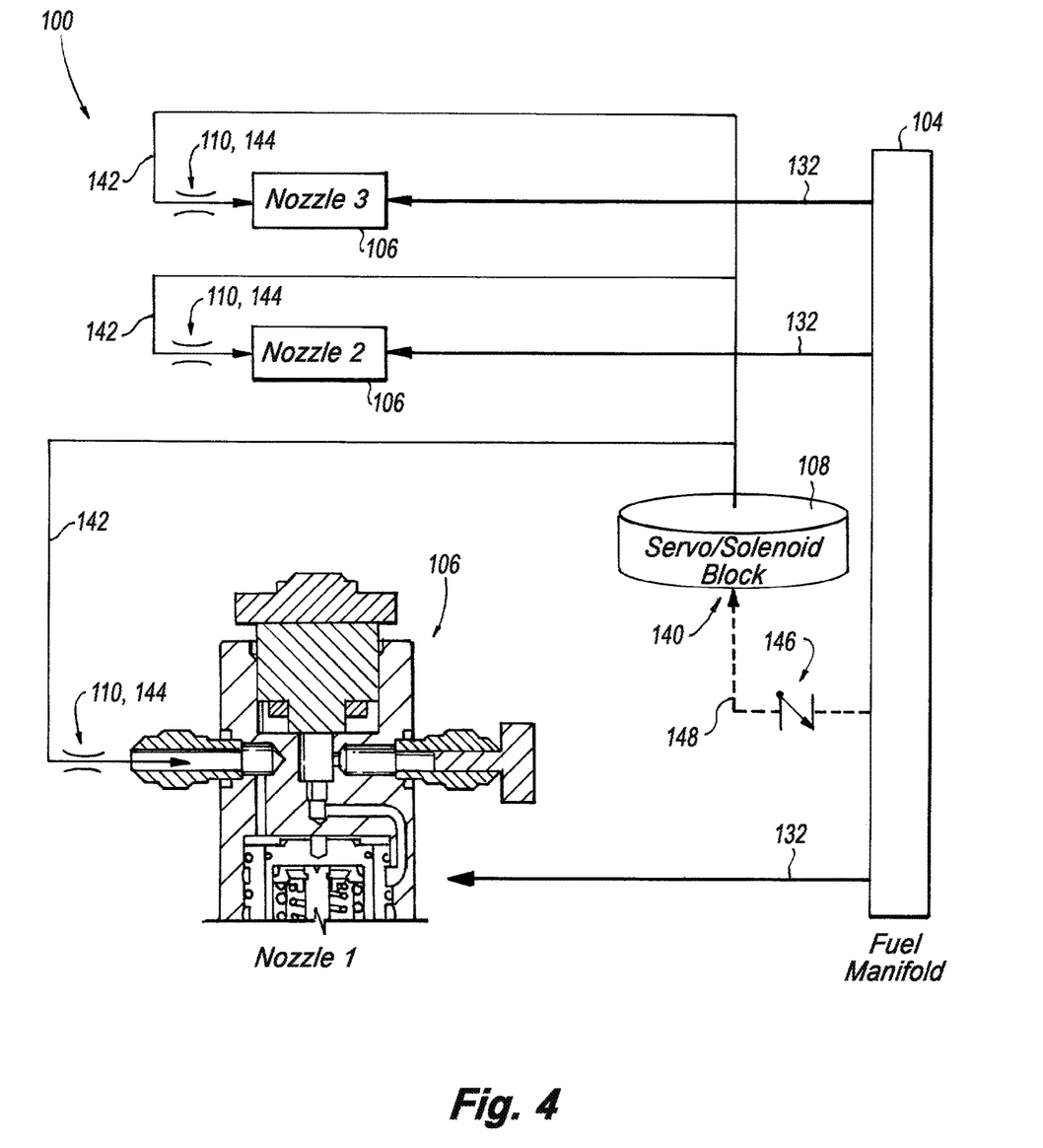

In another configuration of the system 100, with reference to FIG. 4, the manifold 104 connects directly to the respective main circuit 132 of each injector 106 in the plurality of injectors 106. The manifold 104 is also connected to feed an inlet 140 of the valve block 108 directly without passing through any of the injectors 106. A check valve 146 in the line 148 connecting the manifold 104 to the inlet 140 of the valve block 108 is configured to block backflow from the valve block 108 to the manifold 104. A respective outlet branch 142 of the valve block 108 is connected in fluid communication with a respective auxiliary circuit inlet 144 of each injector 106 to supply the respective auxiliary circuit 110 selectively based on state of the valve block 108.

Figure 5:
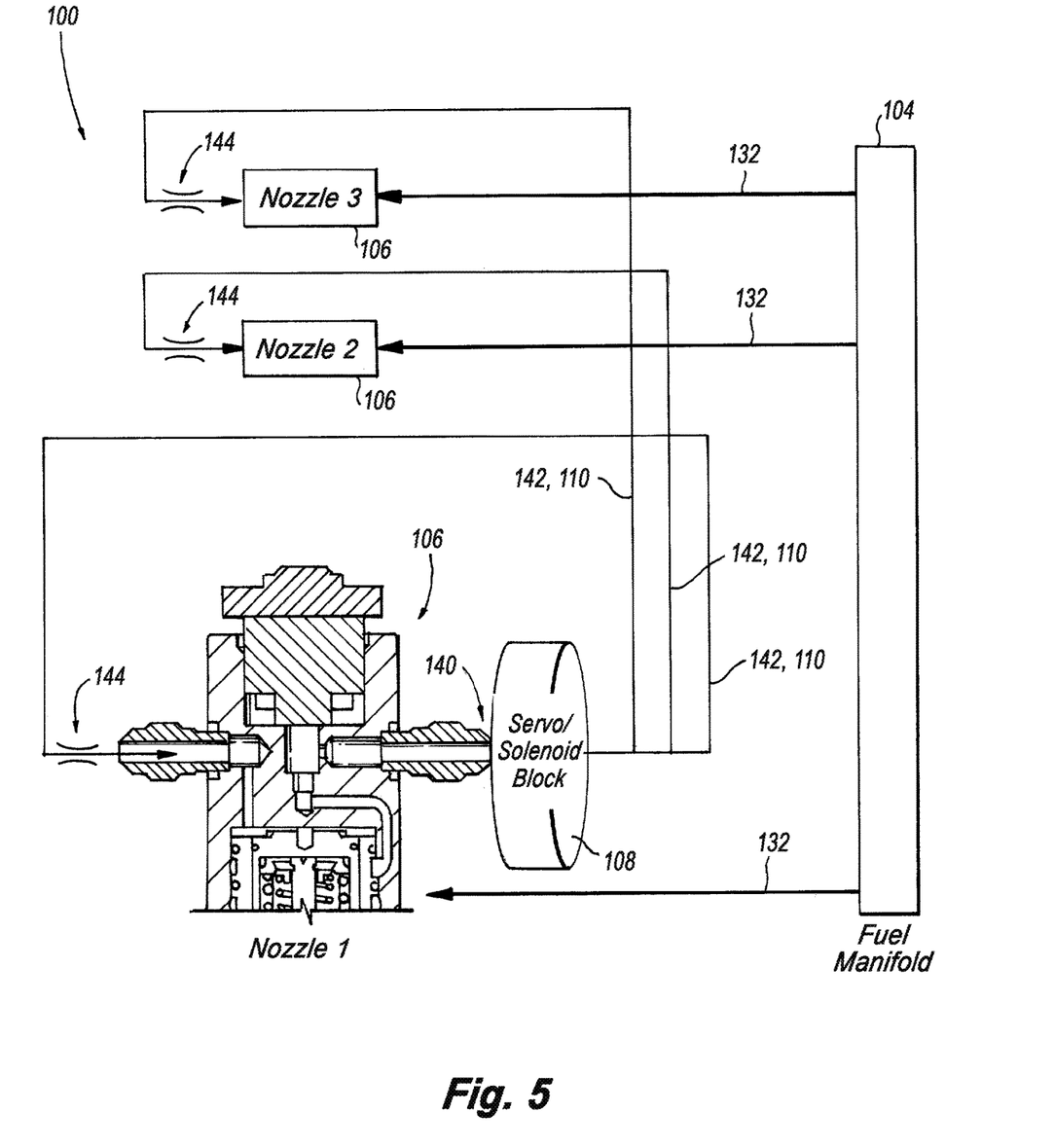

In another configuration of the system 100, with reference to FIG. 5, the manifold 104 connects directly to the respective main circuit 132 of each injector 106. In only one of the injectors 106 in the plurality of injectors 106, a portion of the respective main circuit 132 branches from the injector 106 to feed the inlet 140 of the valve block 108 with pressure from the manifold 104. A respective outlet branch 142 of the valve block 108 is connected in fluid communication with a respective auxiliary circuit inlet 144 for each injector 106 in the plurality of injectors 106 to supply the respective auxiliary circuit 110 selectively based on state of the valve block 108.

Figure 6:
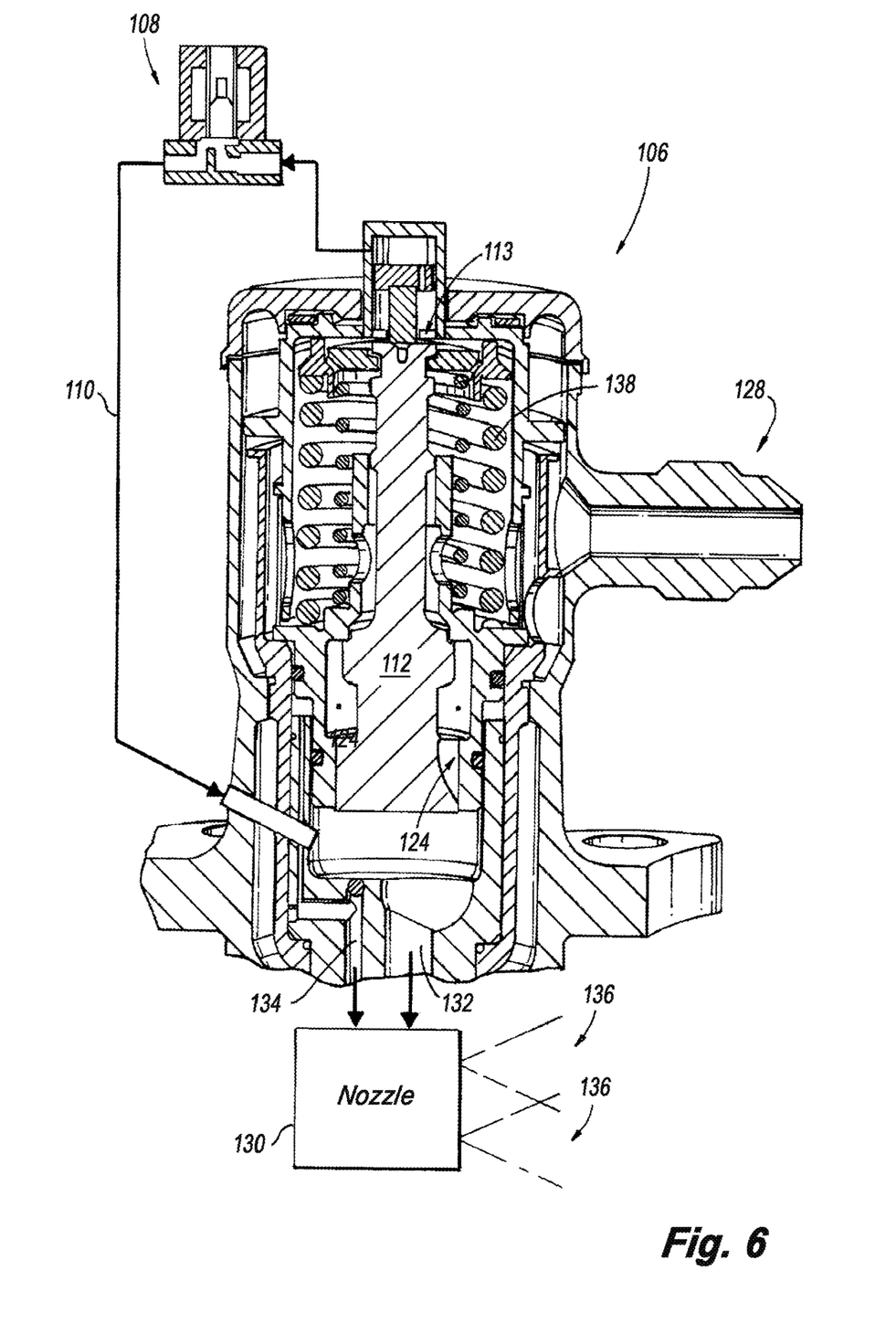
FIG. 6 is a schematic view of a portion of another embodiment of one of the injectors of FIG. 1, showing a configuration for electro-hydraulic actuation through the secondary circuit.
Figure 7:
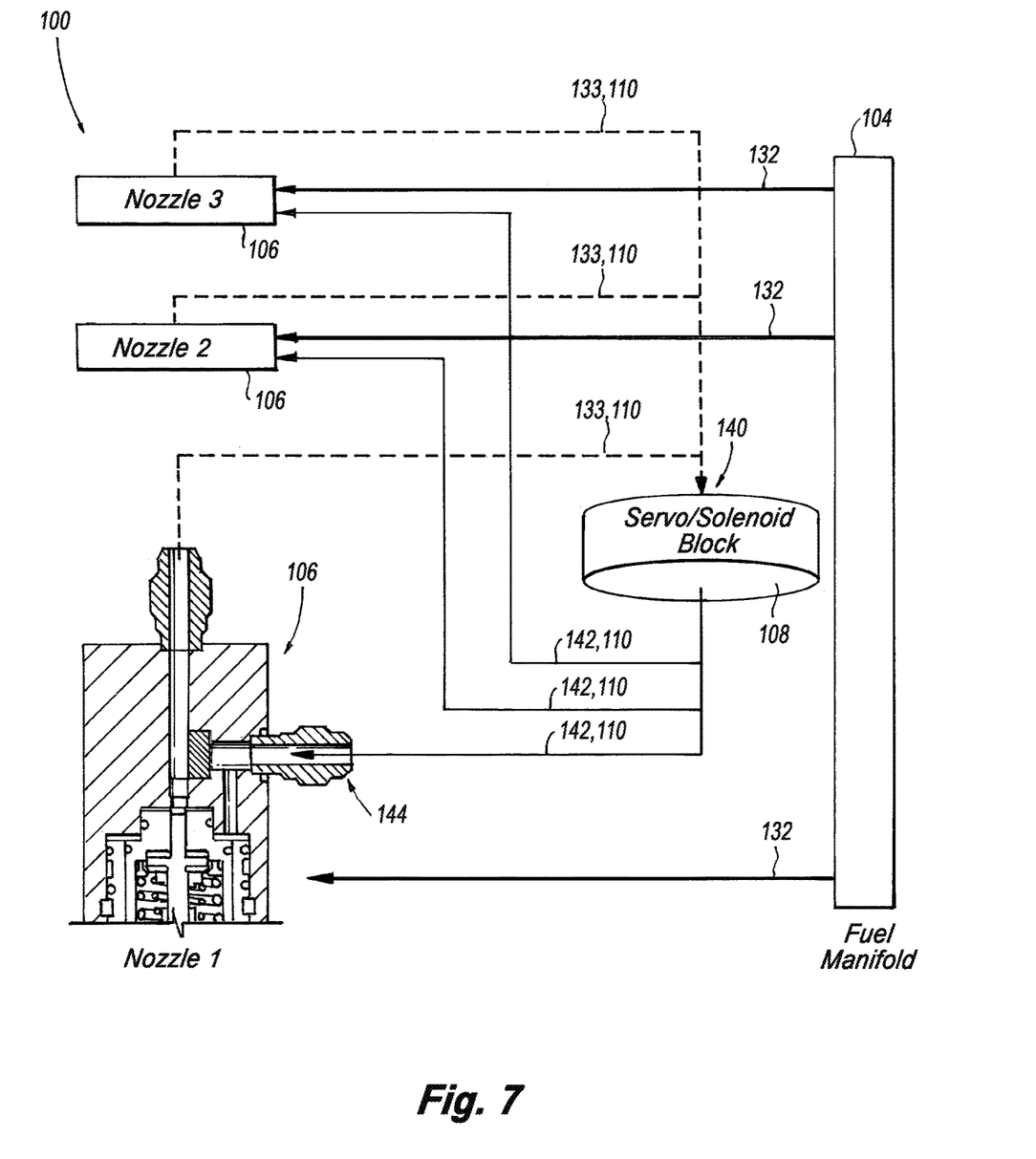
FIGS. 7-9 are schematic views of different configurations for connecting the valve block of the system of FIG. 1 to the actively controlled injectors, using the injector configuration of FIG. 6.
Figure 8:
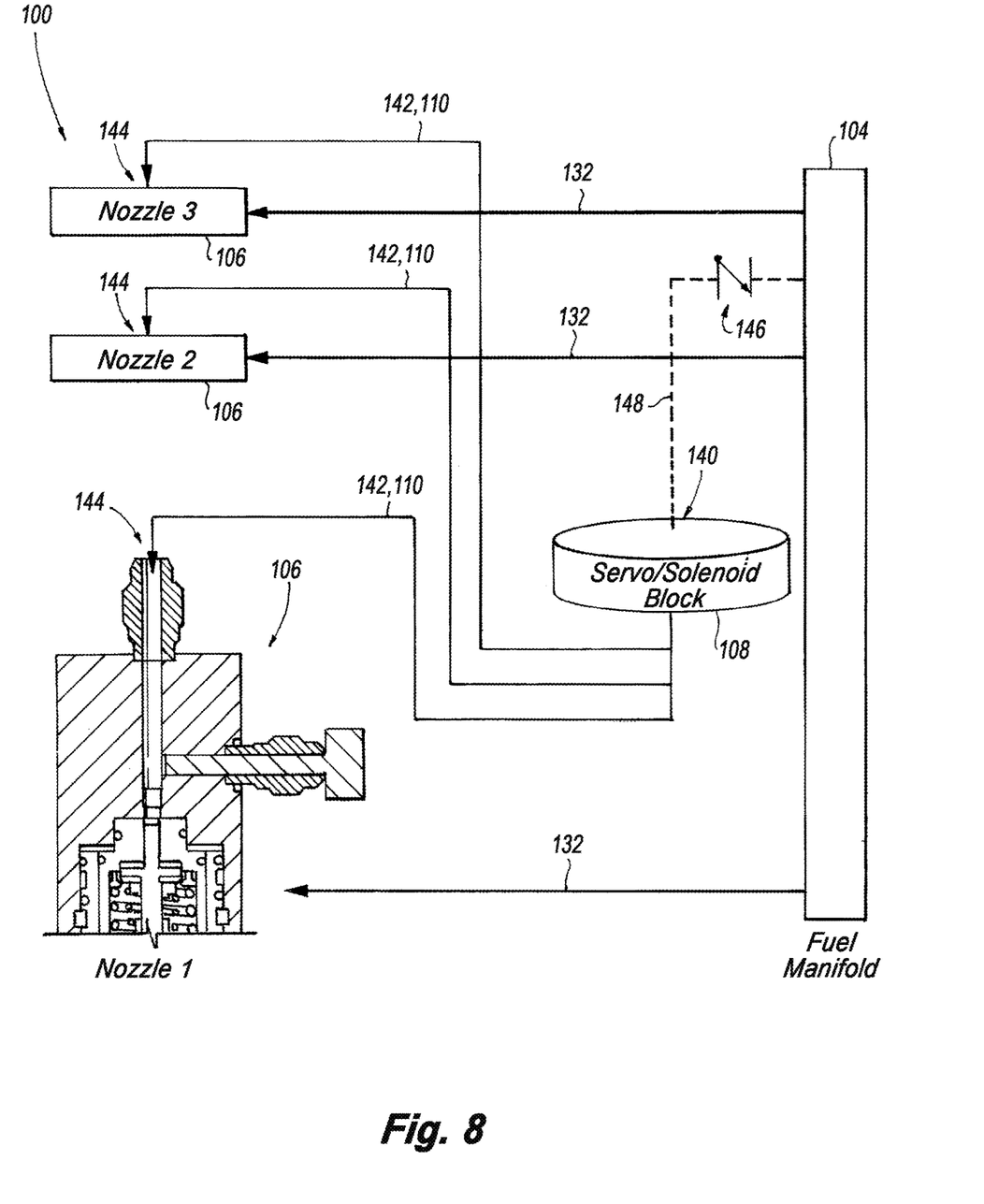
Figure 9:
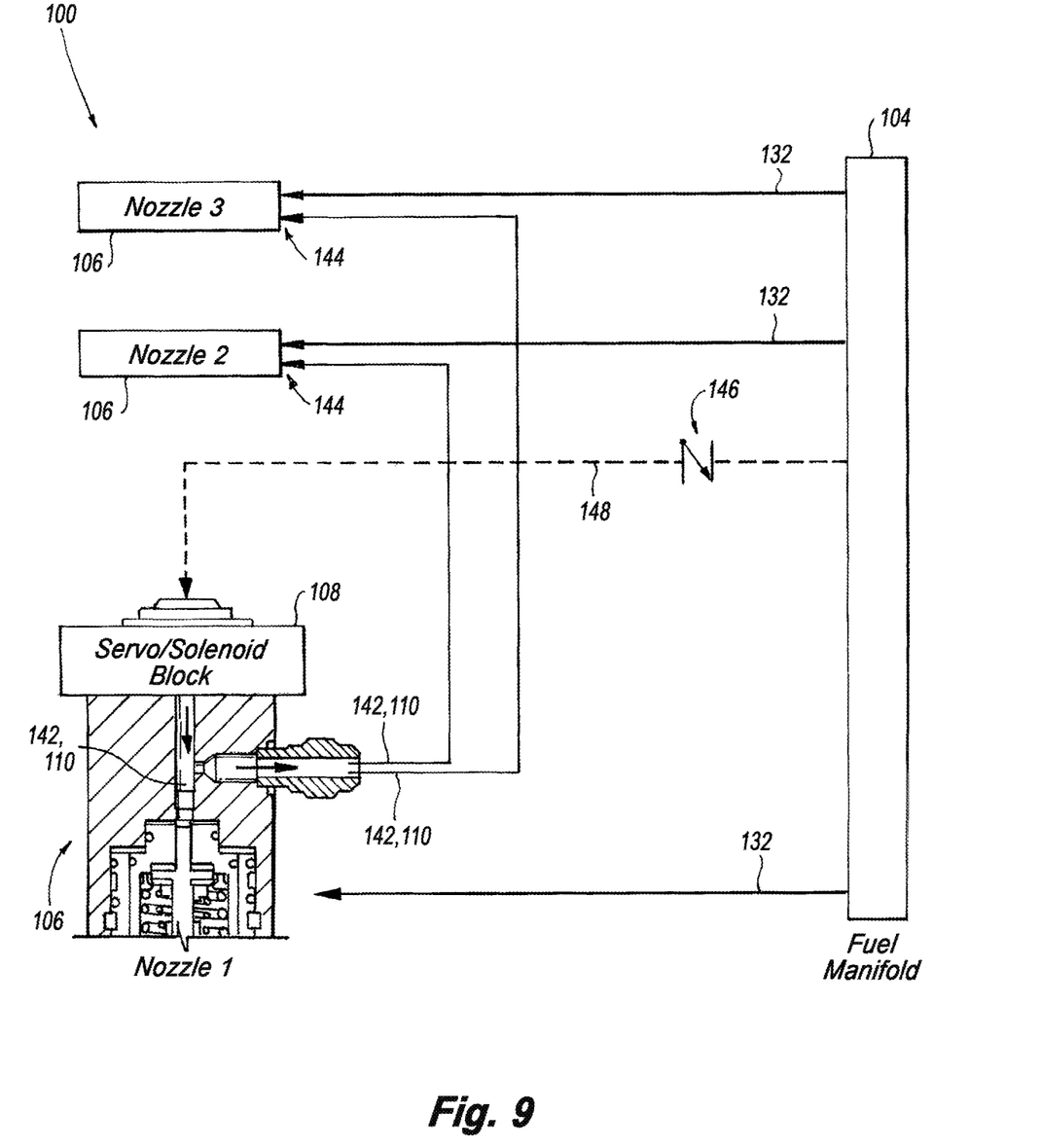

With reference now to FIG. 6, another configuration for the auxiliary circuits 110 is described. For each injector 106 in the plurality of injectors 106, the respective auxiliary circuit 110 can be in fluid communication with a back side 113 of the scheduling valve member 112 to hydraulically actuate the scheduling valve member 112 by changing pressure on the back side 113 of the scheduling valve member. FIGS. 7-9 show configurations of system 100 utilizing nozzles 106 as shown in FIG. 6.

With reference to FIG. 7, the manifold 104 connects directly to the respective main circuit 132 of each injector 106. A portion 133 of the respective main circuit 132 branches from the injector 106 as part of the auxiliary circuit 110, which feeds an inlet 140 of the valve block 108 with pressure from the manifold 104. A respective outlet branch 142 of the valve block 108 is connected in fluid communication with a respective auxiliary circuit inlet 144 to supply the respective auxiliary circuit 110 selectively based on state of the valve block 108.

In the configuration of the system 100 shown in FIG. 8, the manifold 104 connects directly to the respective main circuit 132 of each injector 106. The manifold 104 is connected to feed an inlet 140 of the valve block 108 directly without first passing through any of the injectors 106. A respective outlet branch 142 of the valve block 108 is connected in fluid communication with a respective auxiliary circuit inlet 144 to supply the respective auxiliary circuit 110 selectively based on the state of the valve block 108. A check valve 146 in the line 148 connecting the manifold 108 to the inlet 140 of the valve block 108 is configured to block backflow from the valve block 108 to the manifold 104. FIG. 9 shows a similar configuration to that in FIG. 8, but the valve block 108 is incorporated in only one of the injectors 108 in the plurality of injectors 108. FIGS. 3-5 and 7-9 each show one block of injectors 106, and in FIG. 1 there are two blocks of injectors 106 each block having its own valve block 108. However, those skilled in the art will readily appreciate that any suitable number of blocks can be used.

Systems and methods as disclosed herein provide potential benefits including the following. Failure of solenoid/servo results in limited change in engine operation. Using an actuator/electric valve augments the position of the mechanical valve within the fuel nozzle. Electric valves can work together as a system—if one valve is set to reduce flow, others can be opened to increase flow to compensate. Incorporation of flow sensor, pressure sensor(s), and/or position sensor allows for health monitoring, and active flow control. Electric valves can be gradually actuated to minimize potential pressure spikes within the fuel system. Electric valves for these applications can be fixed state devices, such as solenoids or steppers. They may also be proportional type devices such as servo-valves. Tailoring to valve states between full open/closed states can improve operability of the engine, including ignition, pull away, and noise mitigations through use of proportional control. Systems and methods as disclosed herein allow for reduction in overall system weight and cost. Benefits of the configurations in FIGS. 3-4 and 7-8 are that the actuator can be moved to a more benign environment away from the fuel nozzle allows for improved packaging/protection of sensitive electromechanical input devices (EMIDs). Also, having the actuator separate offers a separate line replaceable unit (LRU) from the nozzle.

The methods and systems of the present disclosure, as described above and shown in the drawings, provide for block valving control for force modification actuation of multiple fuel injectors. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising:
a plurality of injectors consisting of a first sub-set of injectors each having a respective main circuit configured to be connected in fluid communication with one manifold for supplying fuel to each injector in the plurality of injectors, each injector in the plurality of injectors including a respective hydromechanical scheduling valve member configured to regulate fuel flow from a respective inlet to a respective nozzle of each injector of the plurality of injectors as a function of pressure input from the one manifold to the respective main circuits;
a valve block connected in fluid communication with a respective auxiliary circuit in each injector in the plurality of injectors, wherein the respective auxiliary circuit is operatively connected to adjust a position of the respective hydromechanical scheduling valve member for actuating force modification of the respective hydromechanical scheduling valve member, wherein the valve block is configured to control all of the injectors in the plurality of injectors as a block; and
a second sub-set of injectors that are passive, simplex nozzles configured to issue fuel independent of the valve block.

2. The system as recited in claim 1, wherein the first sub-set of injectors is grouped circumferentially offset from the second sub-set of injectors around a gas turbine engine combustor.

3. The system as recited in claim 1, further comprising a controller electrically connected to the valve block for control thereof or for ganged control of the respective auxiliary circuits.

4. The system as recited in claim 3, wherein the valve block is configured as a proportional valve with intermediate conditions between fully open and fully closed for control of the respective auxiliary circuits between full flow and no flow.

5. The system as recited in claim 3, wherein the valve block is configured as a discrete on/off binary state valve with conditions fully open and fully closed for control of the respective auxiliary circuits of full flow and no flow.

6. The system as recited in claim 3, wherein at least one of the injectors in the plurality of injectors includes a mass flow sensor operatively connected to the controller to provide mass flow feedback to the controller.

7. The system as recited in claim 1, wherein loss of electrical power to the valve block causes the respective scheduling valve members to return to a position determined by mechanical components and regulates fuel flow as per a scheduling surface of each of the respective hydromechanical scheduling valve members.

8. The system as recited in claim 1, wherein the respective main circuit is a secondary circuit, wherein each injector of the plurality of injectors includes a primary circuit, wherein the primary and secondary circuits connect between the respective inlet of the injector and two respective outlets of the respective nozzle of the injector for staged flow output from the nozzle.

9. The system as recited in claim 8, wherein for each injector of the plurality of injectors, the respective hydromechanical scheduling valve member is biased to a closed position by one or more biasing members of the injector which push the respective hydromechanical schedule valve members towards the closed position, wherein the scheduling valve member is configured to regulate flow from the inlet of the injector to the secondary circuit, and wherein the scheduling valve member includes a scheduling surface configured to vary flow area through the secondary circuit based on position of a valve spool within the injector.

10. The system as recited in claim 1, wherein for each injector in the plurality of injectors, the respective auxiliary circuit bypasses the respective hydromechanical scheduling valve member to indirectly actuate the respective hydromechanical scheduling valve member by changing pressure downstream of the respective hydromechanical scheduling valve member.

11. The system as recited in claim 10, wherein the one manifold connects directly to the respective main circuit of each injector in the plurality of injectors, wherein a portion of the respective main circuit branches from the injector to feed an inlet of the valve block with pressure from the manifold, and wherein a respective outlet branch of the valve block is connected in fluid communication with a respective auxiliary circuit inlet to supply the respective auxiliary circuit selectively based on state of the valve block.

12. The system as recited in claim 10, wherein the one manifold connects directly to the respective main circuit of each injector in the plurality of injectors, wherein the manifold is connected to feed an inlet of the valve block directly without passing through any of the injectors, and wherein a respective outlet branch of the valve block is connected in fluid communication with a respective auxiliary circuit inlet to supply the respective auxiliary circuit selectively based on state of the valve block.

13. The system as recited in claim 12, further comprising a check valve in a line connecting the one manifold to the inlet of the valve block, configured to block backflow from the valve block to the one manifold.

14. The system as recited in claim 10, wherein the one manifold connects directly to the respective main circuit of each injector in the plurality of injectors, wherein in only one of the injectors in the plurality of injectors, a portion of the respective main circuit branches from the injector to feed an inlet of the valve block with pressure from the one manifold, and wherein a respective outlet branch of the valve block is connected in fluid communication with a respective auxiliary circuit inlet for each injector in the plurality of injectors to supply the respective auxiliary circuit selectively based on state of the valve block.

15. The system as recited in claim 1, wherein for each injector in the plurality of injectors, the respective auxiliary circuit is in fluid communication with a back side of the respective hydromechanical scheduling valve member to hydraulically actuate the respective hydromechanical scheduling valve member by changing pressure on the back side of the respective hydromechanical scheduling valve member.

16. The system as recited in claim 15, wherein the one manifold connects directly to the respective main circuit of each injector in the plurality of injectors, wherein a portion of the respective main circuit branches from the injector to feed an inlet of the valve block with pressure from the one manifold, and wherein a respective outlet branch of the valve block is connected in fluid communication with a respective auxiliary circuit inlet to supply the respective auxiliary circuit selectively based on state of the valve block.

17. The system as recited in claim 15, wherein the one manifold connects directly to the respective main circuit of each injector in the plurality of injectors, wherein the one manifold is connected to feed an inlet of the valve block directly without passing through any of the injectors, and wherein a respective outlet branch of the valve block is connected in fluid communication with a respective auxiliary circuit inlet to supply the respective auxiliary circuit selectively based on state of the valve block.

18. The system as recited in claim 17, further comprising a check valve in a line connecting the one manifold to the inlet of the valve block, configured to block backflow from the valve block to the one manifold.

19. The system as recited in claim 17, wherein the valve block is incorporated in only one of the injectors in the plurality of injectors.

\* \* \* \* \*